United States Patent
Al et al.

(10) Patent No.: US 9,891,734 B2
(45) Date of Patent: Feb. 13, 2018

(54) MOBILE TERMINAL DISPLAY STRUCTURE AND MOBILE TERMINAL

(71) Applicant: Xiaomi Inc., Beijing (CN)

(72) Inventors: Lixin Al, Beijing (CN); Kesheng Yan, Beijing (CN); Jinchao Li, Beijing (CN); Shaoxing Hu, Beijing (CN)

(73) Assignee: Xiaomi Inc., Beijing (CN)

( * ) Notice: Subject to any disclaimer, the term of this patent is extended or adjusted under 35 U.S.C. 154(b) by 53 days.

(21) Appl. No.: 15/045,757

(22) Filed: Feb. 17, 2016

(65) Prior Publication Data

US 2016/0342231 A1    Nov. 24, 2016

(30) Foreign Application Priority Data

May 21, 2015    (CN) .......................... 2015 1 0263821

(51) Int. Cl.
  *G06F 3/041* (2006.01)
  *G06F 1/16* (2006.01)
  *H04M 1/02* (2006.01)

(52) U.S. Cl.
  CPC ............ *G06F 3/041* (2013.01); *G06F 1/1626* (2013.01); *G06F 1/1637* (2013.01); *H04M 1/0266* (2013.01); *G06F 2203/04102* (2013.01); *H04M 1/0268* (2013.01)

(58) Field of Classification Search
  None
  See application file for complete search history.

(56) References Cited

U.S. PATENT DOCUMENTS

2010/0103138 A1    4/2010 Huang et al.
2014/0063719 A1    3/2014 Yamazaki et al.
2014/0354900 A1    12/2014 Qian et al.
(Continued)

FOREIGN PATENT DOCUMENTS

CN    103777817 A    5/2014
CN    103838416 A    6/2014
(Continued)

OTHER PUBLICATIONS

International Search Report dated Jan. 27, 2016 for International Application No. PCT/CN2015/090660, 5 pages.
(Continued)

*Primary Examiner* — Joseph Haley
(74) *Attorney, Agent, or Firm* — Brinks, Gilson & Lione

(57) ABSTRACT

The present disclosure relates to a mobile terminal display structure and a mobile terminal. The display structure may include: a terminal housing; a display module, including a display screen and a glass panel attached to the display screen; wherein the glass panel has a touch region and extension regions bending and extending along both lateral sides of the touch region, an exterior surface of each extension region being located in a same plane with a corresponding edge of the terminal housing. The mobile terminal display structure according to the present disclosure is provided with the glass panel which at least covers both the lateral sides of the whole front surface thereof, and at least the packaging regions on both the lateral sides of the display screen are bended and extended into the housing. A real visual frameless design for the mobile terminal is achieved, while the screen occupying proportion is increased.

16 Claims, 2 Drawing Sheets

(56) References Cited

U.S. PATENT DOCUMENTS

| | | | |
|---|---|---|---|
| 2015/0001477 A1 | 1/2015 | Namkung | |
| 2015/0004382 A1* | 1/2015 | Menon | G06F 3/147 |
| | | | 428/212 |
| 2015/0331451 A1* | 11/2015 | Shin | G06F 3/041 |
| | | | 345/173 |

FOREIGN PATENT DOCUMENTS

| | | |
|---|---|---|
| CN | 204155238 U | 2/2015 |
| CN | 104407754 A | 3/2015 |
| CN | 104850183 A | 8/2015 |
| DE | 10 2012 211 232 A1 | 1/2013 |
| EP | 2 733 912 A1 | 5/2014 |
| EP | 2 755 105 A1 | 7/2014 |
| EP | 2 837 991 A1 | 2/2015 |
| JP | 2013-015835 A | 1/2013 |
| JP | 2014-063159 A | 4/2014 |
| KR | 10-2012-0123767 A | 11/2012 |
| KR | 10-1516766 B1 | 5/2015 |
| RU | 2 419 832 C2 | 5/2011 |

OTHER PUBLICATIONS

Extended European Search Report dated Oct. 21, 2016 for European Application No. 16150748.8, 8 pages.
Office Action dated Sep. 1, 2016 for Chinese Application No. 201510263821.9, 6 pages.
Office Action dated Aug. 16, 2016 for Korean Application No. 10-2015-7033451, 6 pages.
English Translation of International Search Report dated Jan. 27, 2016 for International Application No. PCT/CN2015/090660, 4 pages.
Office Action dated Jul. 4, 2017 for Japanese Application No. 2017-518404, 8 pages.
Office Action dated Mar. 21, 2017 for Russian Application No. 2015156688/08, 14 pages.

* cited by examiner

MOBILE TERMINAL DISPLAY STRUCTURE AND MOBILE TERMINAL

PRIORITY STATEMENT

This application is based upon and claims priority to Chinese Patent Application 201510263821.9, filed on May 21, 2015, the whole contents thereof are incorporated herein by reference.

TECHNICAL FIELD

The present disclosure generally relates to a technical field of electronic device. Specifically, the present disclosure relates to a mobile terminal display structure with a display screen and a mobile terminal.

BACKGROUND

With the developments of the electronic application technology, there are various mobile terminals on the market now, such as mobile phones, tablet computers, personal digital assistances, and so on. The mobile terminals on the market generally include a display screen. But the mobile terminals always have a wide or narrow frame on each of the both sides of the display screen respectively. In order to improve the screen occupying proportion of the display screen, it is desirable for the users that the mobile terminal with a display screen has a narrower frame, or even that the mobile terminal has a frameless structure on each of both sides of the display screen.

SUMMARY

For this, the present disclosure provides a mobile terminal display structure having a novel structure, and a mobile terminal, so as to solve the problem that the display region of a mobile terminal has a quite wide frame.

For the above objects, the present disclosure is achieved by the following technical solutions:

According to an aspect of the present disclosure, a mobile terminal display structure may include a terminal housing; and a display module, including a display screen and a glass panel attached to the display screen. The glass panel includes a touch region including one or more lateral sides, one or more extension regions along one or more lateral sides of the touch region, bending downwards, and an exterior surface of each of the one or more extension regions located in a same plane with a corresponding edge of the terminal housing.

According to another aspect of the present disclosure, a mobile terminal display structure may include a terminal housing; and a display module, including a display screen and a glass panel attached to the display screen. The glass panel includes a touch region including one or more lateral sides, an extension region along a periphery of the touch region and bending downwards, and an exterior surface of the extension region located in a same plane with a corresponding edge of the terminal housing.

The technical solutions provided by the embodiments of the present disclosure may have the following advantages: the mobile terminal display structure according to the present disclosure is provided with the glass panel which at least covers both the lateral sides of the whole front surface thereof, and at least the packaging region on both the lateral sides of the display screen are bended and extended into the housing. By sheltering the packaging regions of both lateral sides of the display screen with the terminal housing, a real visual frameless design for the mobile terminal is achieved, while the screen occupying proportion is increased.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments in accordance with the disclosure and, together with the description, serve to explain the principles of the disclosure.

DETAILED DESCRIPTION

Figure 1:
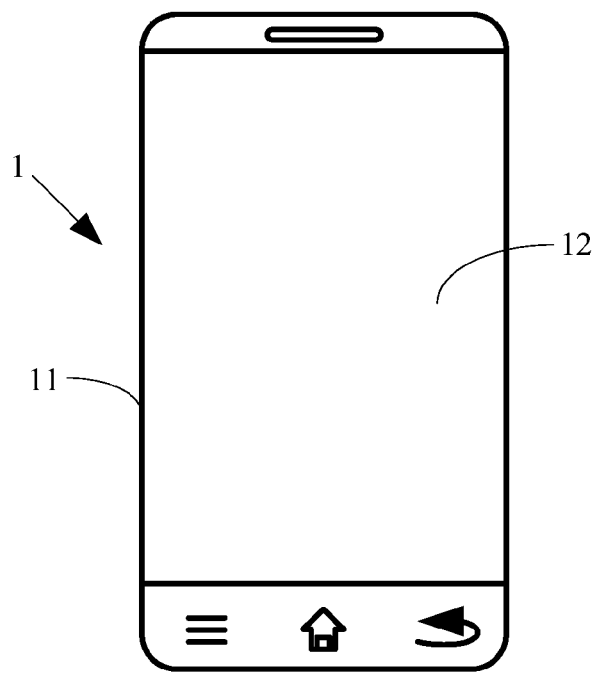
FIG. 1 illustrates a schematic diagram of a main structure of a mobile terminal display structure according to an exemplary embodiment.

One issue with the frameless or super-narrowly framed mobile terminals is that the development thereof is restricted by the traditional technology for display module. For example, in a an existing model of mobile terminal, both edges of a display screen has a black or white silkscreen width for wiring, and there is also a frame enclosing the screen, such that the frame actually often has a width of more than 2.3 mm. Therefore, the display region on the screen of the mobile terminal presents a quite wide visual frame which cannot meet the user's demands.

The present disclosure will be described in detail in combination with the implementations illustrated in the drawings. The implementations, however, do not intend to restrict the present disclosure. Instead, all changes about structures, methods or functions made by those skilled in the art according to the implementations are contained in the protection scope of the present disclosure.

The terms in the present disclosure is used merely for the purpose of describing the particular embodiments, rather than intends to limit the present disclosure. Unless otherwise shown clearly in the context, the singular words "a", "said" and "the" used in the present disclosure and the appended claims also intend to include the plural. It shall also be appreciated that the term "and/or" used herein refers to and includes any or all possible combinations of one or more relevant listed items.

It should be appreciated that, although various of information in the present disclosure may be described by the terms "first", "second" and so on, this information is not limited by the terms. These terms are used merely for distinguishing information of the same type from each other. For example, the first information may also be referred as the second information without departing from the scope of the present disclosure. Similarly, the second information may also be referred as the first information. The word "if" used herein may be explained as "when . . . " or "while" or "in response to determine", depending on the context.

Figure 2:
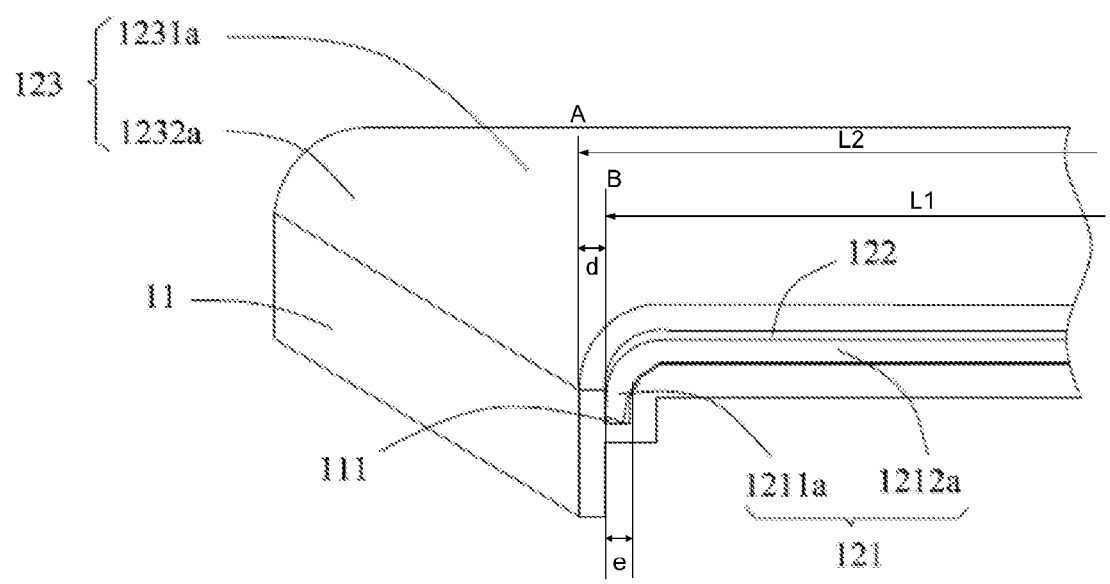
FIG. 2 illustrates a schematic partial cross-section view according to an exemplary embodiment.

FIG. 1 illustrates a schematic diagram of a main structure of a mobile terminal display structure according to an exemplary embodiment; FIG. 2 illustrates a schematic partial cross-section view according to an exemplary embodiment. By designing a new type of display module structure, the mobile terminal display structure 1 provided by the present disclosure obtains a visual effect that a front surface of the mobile terminal display structure 1 is completely covered by a display region 1212a of a display screen 121, and at least the housing frames on both sides of the mobile terminal display structure 1 as well as a silkscreened packaging region 1212a of the display screen 121 are invisible, so as to achieve a real frameless design. Wherein the mobile terminal display structure 1 may be a mobile phone, a tablet computer, a personal digital assistant and so on.

The mobile terminal display structure 1 according to the present disclosure may include: a display module 12 for displaying an image, and a terminal housing 11 for receiving the display module 12. Wherein the display module 12 may include a display screen 121 and a glass panel 123 attached to the display screen 121. The display screen 121 is a liquid crystal display (LCD), and more particular, a flexible liquid crystal display. Such a design allows the shape of the display screen 121 to be changed to adapt installation for different structures. Additionally, the display module 12 may also comprise an optical adhesive 122 for adhering the glass panel 123 to the display screen 121. A fixed connection between the glass panel 123 and the display screen 121 may be achieved by the optical adhesive 122 without degrading the transmittance of the display module 12.

Further, in an embodiment according to the present disclosure, the glass panel 123 may include a touch region 1231a and extension regions 1232a bending downward and extending along both lateral sides (i.e., the left and right sides when viewing the front surface of the mobile terminal display structure 1 during normal use of the user, hereinafter referred to as "both lateral sides") of the touch region 1231a. The exterior surface of each extension region 1232a is in a same plane with a corresponding edge of the terminal housing 11. Both lateral side edges of the glass panel 123 may be fixed to the terminal housing 11 by glue when the glass panel 123 is assembled. Wherein the touch region 1231a and the extension regions 1232a are integrally formed, and the exterior surface of each of the extension regions 1232a is an outward facing side of the extension region 1232a. This arrangement allows frame portions to be formed by the extension regions 1232a and the edges of the terminal housing 11 together. Then, portions on both sides of the terminal housing 11 forming the frames may be invisible when the user is envisaging the display module 12 of the mobile terminal display structure 1 during using, and thus provide an excellent visual effect in use for the user. In addition, since the glass panel 123 is extended to the both lateral side edges of the terminal housing 11, and there is no constraint caused by the frames on both lateral sides, the hand feeling when griping is improved.

Further, projections of the extension regions 1232a on the terminal housing 11 (i.e., the area that the extension regions 1232a project on the terminal housing 11) do not go beyond a projection of the touch region 1231a on the terminal housing 11. This arrangement allows that both sides of the mobile terminal display structure 1 viewing by the user may seem to have a nearly frameless structure when an image displayed by the display screen 121 is transmitted to the user through the touch region 1231a of the glass panel 123. Wherein, since light transmitting through the glass panel 123 will cause a refraction effect, and the glass panel 123 is thin, the user may feel that there is no frame at least on both sides of the mobile terminal display structure 1. According to an exemplary embodiment, the planes in which the extension regions 1232a are located are perpendicular to the plane in which the touch region 1231a is located, and an exterior surface at a bended portion formed by each of the extension regions 1232a and the touch region 1231a may be designed as an arc structure, so as to improve the user's hand feeling when griping the mobile terminal display structure 1.

The display screen 121 according to the present disclosure may include a display region 1212a for displaying an image and a packaging region 1211a bending downward and extending from the periphery of the display region 1212a. The packaging region 1211a may include a black silkscreen portion for wiring the display screen 121 and a sealing structure for sealing the liquid crystal in the display screen 121, and so on. The size of the display screen (display region 1212a and the packaging region 1211a) may be predetermined so that it covers a first area over the terminal housing 11. The width of the first area across the display screen 121 is L1. Similarly, the size of the glass panel 123 (the touch region 1231a and the extension region 1232a) may be predetermined so that it covers a second area over the terminal housing. The width of the second area across the glass panel 123 is L2. Since the display screen 121 is underneath, therefore smaller than, the glass panel 123. Accordingly, L1<L2. An outer edge B of the display screen and an outer edge A of the glass panel is apart for a distance d. The sizes of the class panel 121 and the display screen 123 may be predetermined so that the distance d equals to or substantially equals to the thickness of the glass panel. In other words, a distance between each outer edge of the lateral sides of the packaging region 1211a and a corresponding outer edge of the lateral sides of the extension region 1232a equals to a thickness of each of the extension regions 1232a. The thickness of each of the extension regions 1232a is a size of the extension region 1232a in a direction from the extension region 1232a to an adjacent packaging region 1211a. When ignoring the thickness of the extension regions 1232a, the display screen 121 may cover the entire width of the front surface of the mobile terminal display structure 1. Such design allows the mobile terminal display structure 1 to have a larger screen occupying proportion, achieving the real frameless visual effect.

Further, a projection (e.g., projection e) of the packaging region 1211a on the terminal housing 11 does not go beyond a projection (e.g., projection L1) of the display region 1212a on the terminal housing 11, such that the packaging region 1211a is limited within the display region 1212a, avoiding the user from seeing a part of the packaging region 1211a (which cannot achieve a real frameless effect). The packaging region 1211a and the display region 1212a according to the present disclosure are formed integrally as one single unit. According to an exemplary embodiment, the planes in which the packaging region 1211a are located are perpendicular to the plane in which the display region 1212a is located. According to an exemplary embodiment, the terminal housing 11 is provided with a recess 111 at each of both lateral side edges for containing the packaging region 1211a. The recess 111 may restrict the packaging region 1211a of the display screen 121 on the terminal housing 11, in particular, by adhesive securing or snap securing and so on. Wherein the recess 111 on the terminal housing 11 may not only serve to secure the display screen 121, but also, above all, may serve to hide the packaging region 1211a on both sides of the display screen 121, so as to show the user the display region 1212a of the display screen 121, providing the user with excellent visual enjoyment.

Figure 3:
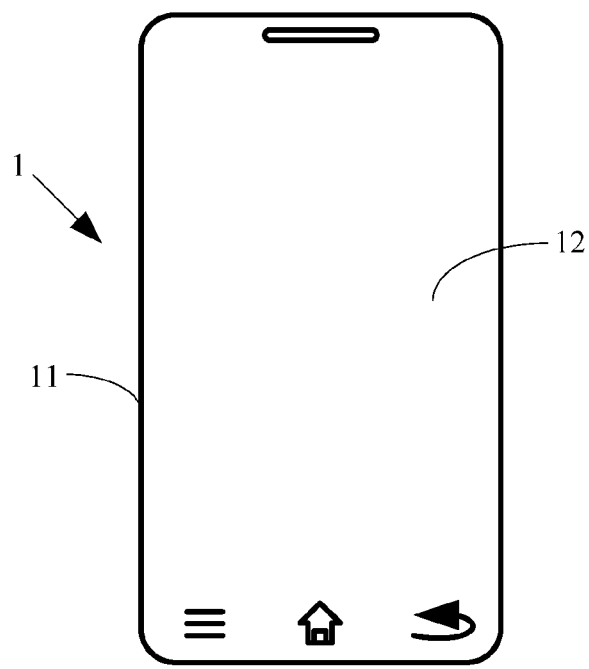
FIG. 3 illustrates a schematic diagram of a main structure of a mobile terminal display structure according to another exemplary embodiment.
Figure 4:
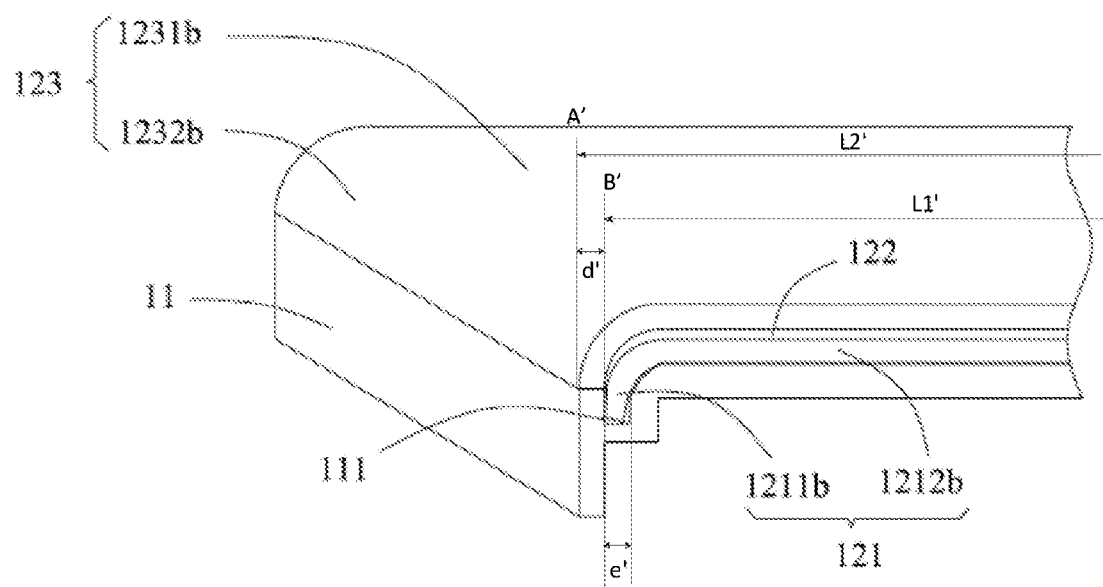
FIG. 4 illustrates a schematic partial cross-section view according to another exemplary embodiment.

As shown in FIGS. 3 and 4, in another embodiment of the present disclosure, a mobile terminal display structure 1 may include: a display module 12 for displaying an image, and a terminal housing 11 for receiving the display module 12. Wherein the display module 12 may include a display screen 121 and a glass panel 123 attached to the display screen 121. The display screen 121 may be a flexible liquid crystal display. The glass panel 123 may include a touch region 1231b and an extension region 1232b bending downward and extending along a periphery of the touch region 1231b, the exterior surface of the extension region 1232b is in a same plane with a corresponding edge of the terminal housing 11. The circumferential edges of the glass panel 123 may be secured to the terminal housing 11 by adhesive when the glass panel 123 is assembled, wherein the touch region 1231b and the extension region 1232b are formed integrally as a single unit. This arrangement allows frame portions to be formed by the extension region 1232b and the edges of the terminal housing 11 together. The glass panel 123 is covered on the whole front surface of the mobile terminal display structure 1, accordingly, portions on both sides of the terminal housing 11 forming the frames may be invisible when the user is envisaging the display module 12 (e.g., a screen of the mobile terminal) of the mobile terminal display structure 1 during using, and thus provide an excellent visual effect in use for the user. In addition, since the glass panel 123 is extended to the both lateral side edges of the terminal housing 11, and there is no constraint caused by the circumferential frame of the mobile terminal display structure 1, the hand feeling when griping is improved.

Further, a projection of the touch region 1231b on the terminal housing 11 overlaps with a periphery of the terminal housing 11, such that the entire front surface of the mobile terminal display structure 1 is covered by the touch region 1231b of the glass panel 123, so as to achieve a control of the display screen 121. Because the entire front surface of the mobile terminal display structure 1 is covered by the display screen 121, a frameless mobile terminal display structure 1 is achieved. According to an exemplary embodiment, the planes in which the extension regions 1232b are located are perpendicular to the plane in which the touch region 1231b is located, and an exterior surface at the bended portion formed by the extension region 1232b and the touch region 1231b may be designed as an arc structure, so as to improve the user's hand feeling when griping the mobile terminal display structure 1.

The display screen 121 according to the present disclosure may include a display region 1212b for displaying an image, and a packaging region 1211b bending downward and extending along the periphery of the display region 1212b. The packaging region 1211b may include black silkscreen portions for wiring the display screen 121, and sealing structures for sealing the liquid crystal in the display screen 121, and so on. The size of the display screen (display region 1212b and the packaging region 1211b) may be predetermined so that it covers a first area over the terminal housing 11. The width of the first area across the display screen 121 is LI. Similarly, the size of the glass panel 123 (the touch region 1231b and the extension region 1232b) may be predetermined so that it covers a second area over the terminal housing. The width of the second area across the glass panel 123 is L2'. Since the display screen 121 is underneath, therefore smaller than, the glass panel 123. Accordingly, L1'<L2'. An outer edge B' of the display screen and an outer edge A' of the glass panel is apart for a distance d'. The sizes of the class panel 121 and the display screen 123 may be predetermined so that the distance d equals to or substantially equals to the thickness of the glass panel. In other words, a distance between a periphery of a projection of the display region 1212b on the terminal housing 11 and a periphery of a projection of the touch region 1231b on the terminal housing 11 equals to a thickness of the extension region 1232b. The thickness of the extension region 1232b is a size of the extension region 1232b in a direction from the extension region 1232b to an adjacent packaging region 1211b. When ignoring the thickness of the extension region 1232b, the entire front surface of the mobile terminal display structure 1 is covered by the display screen 121, which allows mobile terminal display structure 1 to have a larger screen occupying proportion, achieving the real frameless visual effect.

Further, a projection (e.g., the projection e') of the packaging region 1211b on the terminal housing 11 does not go beyond a projection (e.g., projection L1') of the display region 1212b on the terminal housing 11, such that the packaging region 1211b is limited within the display region 1212b, avoiding the user from seeing a part of the packaging region 1211b (which cannot achieve a real frameless effect). The packaging region 1211b and the display region 1212b according to the present disclosure are formed integrally as one single unit. According to an exemplary embodiment, the planes in which the packaging region 1211b are located are perpendicular to the plane in which the display region 1212b is located. According to an exemplary embodiment, the terminal housing 11 is provided with a recess 111 at a circumferential edge for containing the packaging region 1211b. The recess 111 may restrict the packaging region 1211b of the display screen 121 on the terminal housing 11, in particular, by adhesive securing or snap securing and so on. Wherein the recess 111 on the terminal housing 11 may not only serve to secure the display screen 121, but also, above all, may serve to hide the packaging region 1211b on both sides of the display screen 121, so as to show the user the display region 1212b of the display screen 121, providing the user with excellent visual enjoyment.

The mobile terminal display structure according to the present disclosure adopts a flexible display screen, which achieves the frameless effect on both sides of the mobile terminal display structure or on the whole front surface of the mobile terminal display structure as desired, by bending and hiding the packaging region of the flexible screen into the recess on the exterior edge of the terminal housing. In addition, the whole front surface of the mobile terminal display structure is covered by the glass panel. The bending arrangement of the glass panel and the exterior edges of the terminal housing constitute the frames of the housing of the mobile terminal display structure together, thereby a combined structure of the glass panel and the display screen according to the present disclosure allows the screen occupying proportion to be increased significantly, while achieving the real visual frameless design for the mobile terminal display structure.

Further, the present disclosure also discloses a mobile terminal, which may include the display structure disclosed in the above embodiments.

Other embodiments of the disclosure will be apparent to those skilled in the art in consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples are considered as exemplary only, with a protection scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A mobile terminal display structure comprising:
a terminal housing; and
a display module, including a display screen and a glass panel attached to the display screen,
wherein the glass panel includes:
a touch region including one or more lateral sides,
one or more extension regions along one or more lateral sides of the touch region, bending downwards, and
an exterior surface of each of the one or more extension regions located in a same plane with a corresponding edge of the terminal housing, and
wherein the display screen comprises:
a display region configured to display an image, including one or more side edges,
a packaging region along a periphery of the display region and bending downward, and
wherein a distance between an outer edge of the packaging region and a corresponding outer edge of the one or more extension regions equals to a thickness of the one or more extension regions.

2. The mobile terminal display structure of claim 1, wherein the one or more extension regions are perpendicular to the touch region.

3. The mobile terminal display structure of claim 1, wherein for each of the one or more extension regions, an area of each projected on the terminal housing does not go beyond an area of the touch region projected on the terminal housing.

4. The mobile terminal display structure of claim 1, wherein a portion of the packaging region is perpendicular to the display region.

5. The mobile terminal display structure of claim 1, wherein an area of the packaging region projected on the terminal housing does not go beyond a projection of the display region on the terminal housing.

6. The mobile terminal display structure of claim 1, wherein the terminal housing further comprises a recess to receive the packaging region.

7. The mobile terminal display structure of claim 1, wherein the display screen comprises a flexible liquid crystal display.

8. A mobile terminal comprising the mobile terminal display structure according to claim 1.

9. A mobile terminal display structure comprising:
a terminal housing; and
display module, including:
an optical adhesive layer comprising a first side and a second side,
a display screen attached to the first side of the optical adhesive layer, and
a glass panel attached to the second side of the optical adhesive layer,
wherein the glass panel comprises:
a touch region including one or more lateral sides,
an extension region along a periphery of the touch region and bending downwards, and
an exterior surface of the extension region located in a same plane with a corresponding edge of the terminal housing, and
wherein the display screen comprises:
display region configured to display an image,
a packaging region extending along a periphery of the display region and bending downward, and
a distance between an outer edge of the packaging region and a corresponding outer edge of the extension region equals to a thickness of the extension region.

10. The mobile terminal display structure of claim 9, wherein the extension region is perpendicular to the touch region.

11. The mobile terminal display structure of claim 9, wherein an area of the touch region projected on the terminal housing overlaps a periphery of the terminal housing.

12. The mobile terminal display structure of claim 9, wherein a portion of the packaging region is perpendicular to the display region.

13. The mobile terminal display structure of claim 9, wherein an area of the packaging region projected on the terminal housing does not go beyond a projection of the display region on the terminal housing.

14. The mobile terminal display structure of claim 9, wherein the terminal housing further comprises a recess to receive the packaging region.

15. The mobile terminal display structure of claim 9, wherein the display screen comprises a flexible liquid crystal display.

16. A mobile terminal comprising the mobile terminal display structure according to claim 9.

* * * * *